United States Patent [19]

Minamitaka

[11] Patent Number: 5,003,860

[45] Date of Patent: Apr. 2, 1991

[54] AUTOMATIC ACCOMPANIMENT APPARATUS

[75] Inventor: Junichi Minamitaka, Fussa, Japan

[73] Assignee: Casio Computer Co., Ltd., Tokyo, Japan

[21] Appl. No.: 290,295

[22] Filed: Dec. 22, 1988

[30] Foreign Application Priority Data

Dec. 28, 1987 [JP] Japan ................................ 62-333595

[51] Int. Cl.[5] ........................ G01H 7/00; G01H 1/38; G01H 1/28

[52] U.S. Cl. ........................................ 84/609; 84/613; 84/637; 84/638; 84/669; 84/716

[58] Field of Search ............... 84/1.17, 1.03, DIG. 12, 84/DIG. 22, 1.24, DIG. 5, 609, 610, 613, 634, 637-638, 649-650, 666, 669, 712, 715, 716

[56] References Cited

U.S. PATENT DOCUMENTS

| | | | |
|---|---|---|---|
| 4,192,212 | 3/1980 | Yamaga et al. | 84/1.03 |
| 4,217,804 | 8/1980 | Yamaga et al. | 84/1.03 |
| 4,275,634 | 6/1981 | Imamura et al. | 84/1.03 |
| 4,351,214 | 9/1982 | Suzuki et al. | 84/1.17 X |
| 4,353,278 | 10/1982 | Adachi . | |
| 4,450,742 | 5/1984 | Sugiura | 84/1.17 X |
| 4,489,636 | 12/1984 | Aoki . | |
| 4,499,807 | 2/1985 | Ishida . | |
| 4,543,869 | 10/1985 | Kawashima et al. | 84/1.03 X |

*Primary Examiner*—A. T. Grimley
*Assistant Examiner*—Matthew S. Smith
*Attorney, Agent, or Firm*—Frishauf, Holtz, Goodman & Woodward

[57] ABSTRACT

An automatic accompaniment apparatus plays, in real-time, an accompanimental line that is subordinated to a melodic line and formed by a succession of harmonic and nonharmonic tones. The apparatus comprises a key determining unit which determines a key in the current chord interval from a series of chords supplied from a musical performance input unit such as a keyboard, an arpeggio generator which forms the arpeggio portion of accompanimental line in the current chord interval by using the members of the current chord, and a nonharmonic generator which produces the nonharmonic portion of accompanimental line in the current chord interval by selecting nonharmonic tones from a scale having the determined key. In an embodiment, there is further provided a knowledge memory storing knowledge of classifying nonharmonic tones and an accompaniment memory storing accompanimental pattern data forming the basis of the final accompanimental line. The pattern data comprise a row of harmonic and nonharmonic tone identifiers with timings indicating when respective tones should be sounded. An inference engine makes use of the stored knowledge to find nonharmonic tones corresponding to the respective identifiers of nonharmonic tones in the pattern. Therefore, the present apparatus can provide a musical accompaniment that is tonal and diversified.

14 Claims, 18 Drawing Sheets

| CHORD | AVAILABILITY OF DIATONIC SCALE | KEY NOTE | CORRESPONDING SCALE |
|---|---|---|---|
| maj | O | ROOT (1ST) | DIATONIC |
| min | O | MINOR 3RD | DIATONIC |
| 7th | O | 4TH | DIATONIC |
| m7th | O | MINOR 3RD | DIATONIC |
| dim | X | ROOT | DIMINISHED |
| aug | X | ROOT | WHOLE TONE |
| 7–5 | X | ROOT | WHOLE TONE |
| m7–5 | O | MINOR 2ND | DIATONIC |
| 7+5 | X | ROOT | WHOLE TONE |
| m7+5 | O | MINOR 3RD | DIATONIC |

| TYPE OF SCALE | DATA |
|---|---|
| DIATONIC | AB5 |
| WHOLE TONE | 555 |

DATA FORMAT

| ADDRESS | DATA | KIND | COMMENT |
|---|---|---|---|
| 0 | 31 | HARMONIC | 1ST HARMONIC TONE IN 3RD OCTAVE |
| 1 | 0 | nop | |
| 2 | 1 | NONHARMONIC | PASSING TONE |
| 3 | 0 | nop | |
| 4 | 32 | HARMONIC | 2ND HARMONIC TONE IN 3RD OCTAVE |
| 5 | 0 | nop | |
| 6 | 3 | NONHARMONIC | APPOGGIATURA |
| 7 | 0 | nop | |
| 8 | 33 | HARMONIC | 3RD HARMONIC TONE IN 3RD OCTAVE |
| 9 | 0 | nop | |
| 10 | 4 | NONHARMONIC | ESCAPE TONE |
| 11 | 0 | nop | |
| 12 | 32 | HARMONIC | 2ND HARMONIC TONE IN 3RD OCTAVE |
| 13 | 0 | nop | |
| 14 | 0 | nop | |
| 15 | 0 | nop | |

C MAJOR (ROOT POSITION) (SECOND INVERSION)

| NO. | DATA | CHORD TYPE |
|---|---|---|
| 0 | $091_{16}$ | maj |
| 1 | $089_{16}$ | min |
| 2 | $049_{16}$ | dim |
| 3 | $111_{16}$ | aug |
| 4 | $0a1_{16}$ | sus 4 |
| 5 | $491_{16}$ | 7th |
| 6 | $489_{16}$ | m7th |

| ADDRESS | L | X | U | Y | N |
|---|---|---|---|---|---|
| 0 | 0 | 1 | 0 | 2 | 3 |
| 5 | 2 | 2 | 2 | 2 | i ℓℓ |
| 10 | 2 | 2 | 2 | 4 | 5 |
| 15 | 2 | 3 | 2 | 1 | 3 |
| 20 | 2 | 3 | 2 | 4 | i ℓℓ |
| 25 | EOF | | | | |

EXAMPLE OF RULE DATA

AUTOMATIC ACCOMPANIMENT APPARATUS

BACKGROUND OF THE INVENTION

The present invention relates to electronic musical instruments and, in particular to an apparatus for automatically providing an accompaniment.

An automatic accompaniment apparatus that performs an accompanimental line such as bass, obbligato in combination with a melody is known. Such apparatus generally includes a memory which stores an accompaniment pattern data forming the basis of the accompanimental line. The pattern consists of horizontal or time information indicating when tones should be sounded and vertical information about the accompanimental line. According to chord information supplied by a player via a musical performance input unit such as a keyboard, the vertical information of the accompanimental line is converted into a succession of pitches.

In one prior art accompaniment apparatus, the vertical information is formed with data specifying pitch ordinal locations of a plurality of input notes forming a chord. In operation, the location specifying data in the accompaniment pattern are respectively converted into corresponding pitches of chord notes. While the apparatus can provide an accompanimental line in inversions by inputting a chord in corresponding positions by means of the musical performance unit, it cannot produce tones other than the input chord members because of the principles of the apparatus. An example of the apparatus of this type is disclosed in Yamaga et al U.S. Pat. No. 4,217,804 issued on Aug. 19, 1980.

In another prior art apparatus, the vertical information of accompaniment pattern is given by stored data each specifying a pitch interval or distance from the root of chord. The interval specifying data are changed depending on the type of chord. For example, if a minor chord is designated, the data element specifying (major) third scale degree above the root is lowered by a half step and then added to the root of the minor chord to define the final pitch. Whereas the apparatus of this kind can provide an accompanimental line containing nonharmonic tones, it cannot guarantee that the produced nonharmonic tones are always proper or desirable in terms of music. Let a diatonic scale be available for chords such as major and minor. Under the assumption, a data element specifying second scale degree above the root is always converted into a pitch higher than the root by major second (three semitones) whenever a major or minor chord is provided. Therefore, each time the root of chord varies, the pitch of nonharmonic tone will change in parallel. This will lose the sense of key in the accompanimental line.

SUMMARY OF THE INVENTION

It is, therefore, an object of the present invention to provide an automatic accompaniment apparatus capable of providing an accompanimental line key changes of which are natural.

Another object of the invention is to provide an automatic accompanimental apparatus capable of providing an accompanimental line that is supported by appropriate knowledge of music.

In accordance with the invention, there is provided an apparatus for automatically providing an accompanimental line formed by a succession of harmonic and nonharmonic tones in response to chords supplied from musical performance input means. The apparatus comprises key determining means which determines a key in the current chord interval (duration) from a series of the supplied chords, arpeggio line forming means which produces a line of harmonic tones in the current chord interval using the members of the current chord, and nonharmonic tone adding means which selects nonharmonic tones from a scale having the key determined by the key determining means to add the selected nonharmonic tones to the line of harmonic tones.

It should be noted that the present invention contemplates an important function of music i.e., tonality which has been disregarded by the prior art. The scale having the key determined by the key determining means defines a set of tones available for the accompanimental line. Tones outside the scale are avoided. In the prior art, however, such avoid notes can be produced as tones in the accompanimental line because no attention is paid to the key. For example, a note of F-Sharp is undesirable for a key of C. In the prior art, a pattern element designating second degree above the root of chord turns out to be a note of F-sharp in response to a chord of E minor. The same pattern element will make a note of F-natural suitable for the key of C when the present invention is applied.

In an embodiment, the key determining means comprises key preserving means which maintains the key in the current interval unchanged from the preceding key whenever all the members of chord in the current interval are included in the scale of the preceding key, and modulation means which changes the key in the current interval from the preceding key when the chord in the current interval contains a member outside the scale of the preceding key. Preferably, the modulation means uses the preceding key as the initial reference key and starting therefrom, successively changes the reference key to its related keys until a key is encountered which provides the scale containing all the members of the current chord. The key thus obtained defines the current key. The key determining means may further comprises means for selecting the root of chord in the current interval to be the key in the current interval when the chord in the current interval is irrelevant to tonality. The key preserving means and the modulation means are operable only when the chord in the current interval is relevant to tonality. Only the key determined in the preceding interval with a chord that is relevant to tonality is referenced as the preceding key by the key preserving mean and modulation means. For example, major and minor chords are assignable to diatonic scale relevant to tonality.

In accordance with a further aspect of the invention, there is provided an automatic arpeggio apparatus which produces an accompanimental line formed by a succession of harmonic and nonharmonic tones using accompaniment pattern data that form the basis of the accompanimental line. The pattern data comprises harmonic tone identifiers specifying types of chord members, timing data indicating when harmonic tones corresponding to the respective harmonic tone identifiers are to be sounded, nonharmonic tone identifiers specifying the types of nonharmonic tones and timing data indicating when nonharmonic tones corresponding to the respective nonharmonic tone identifiers are to be sounded. To obtain arpeggio portion of the accompanimental line, there is provided arpeggio line forming means which decodes the respective harmonic tone identifiers in the accompaniment pattern data based on the current chord to produce a line of harmonic tones. Nonharmonic tone in the accompanimental line are produced by the combination of key determining means, musical knowledge storage means, inference means for deducing nonharmonic tones and nonharmonic tone adding means for adding the deduced nonharmonic tones to the line of harmonic tones. The storage means stores knowledge of classifying types of nonharmonic tones. The nonharmonic tones deduced by the inference means are selected from the scale of the key determined by the key determining means. In addition, each deduced tone has a character coinciding with the type specified by the nonharmonic tone identifier. The matching is verified by applying the stored knowledge.

Preferably, the inference means comprises means for selecting a nonharmonic tone candidate from the scale of the determined key, exclusive of the members of chord in the current interval, means for computing the situation of an accompanimental line that will be formed when combining the candidate with the line of harmonic tones, and means for applying the knowledge to the computed situation to identify the type of the candidate and means for comparing the identified type of the candidate with that specified by said nonharmonic tone identifier.

With this arrangement, nonharmonic tones to be combined with the line of harmonic tones vary depending on several factors, namely, the pattern of accompaniment, key, line of harmonic tones and knowledge of classifying nonharmonic tones. Therefore, the apparatus can provide an accompaniment that is tonal, well-controlled and diversified.

BRIEF DESCRIPTION OF THE DRAWINGS

The above and other objects, features and advantages of the invention will become more apparent from the following description in connection with the drawing in which.

Figures 2, 6:
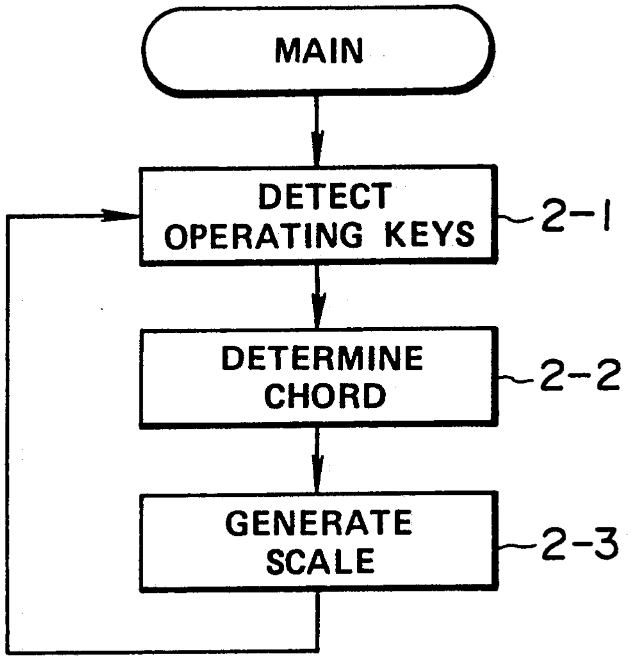
FIG. 2 is a main flowchart of the operation of the embodiment.
Figure 3:
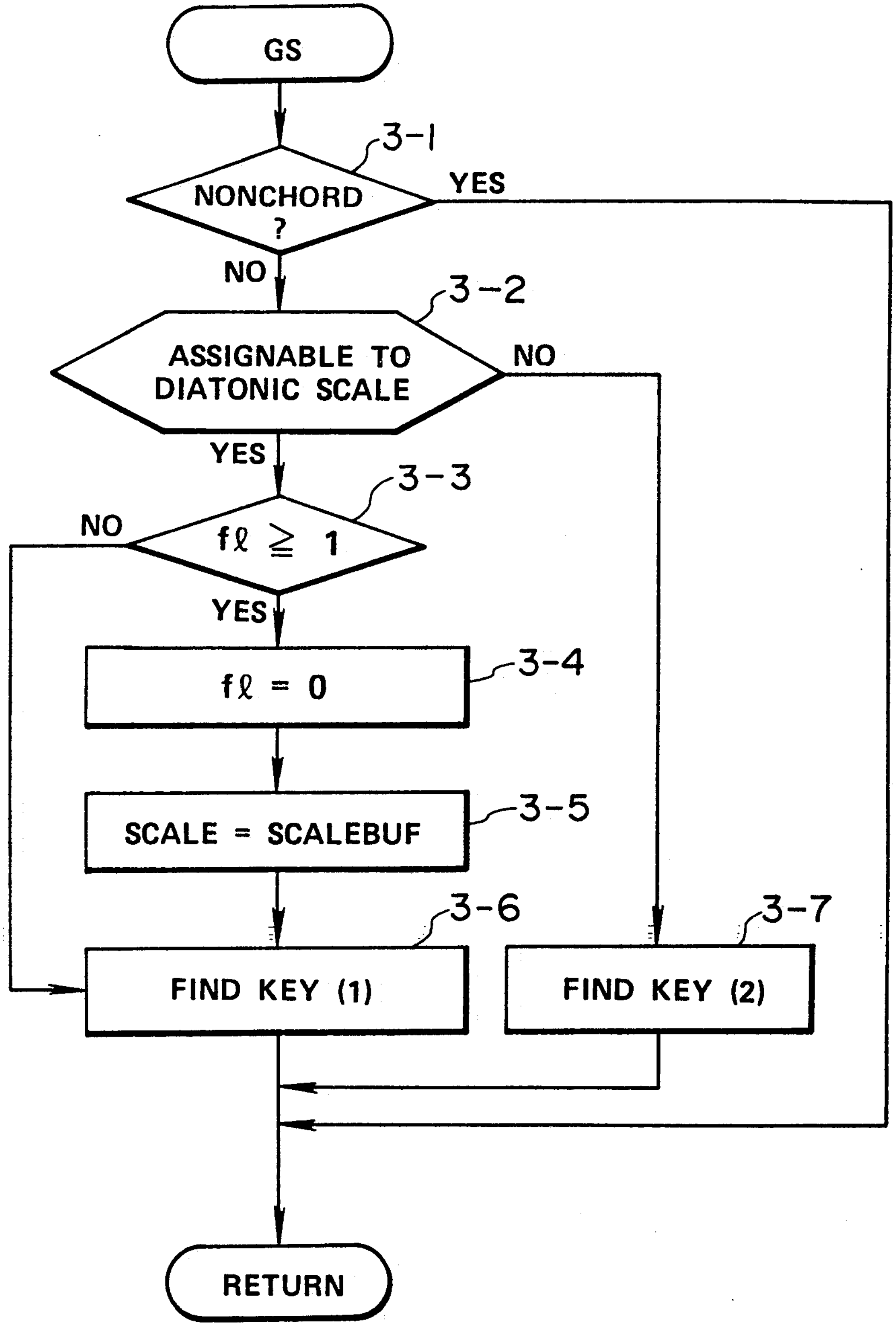
Figure 4:
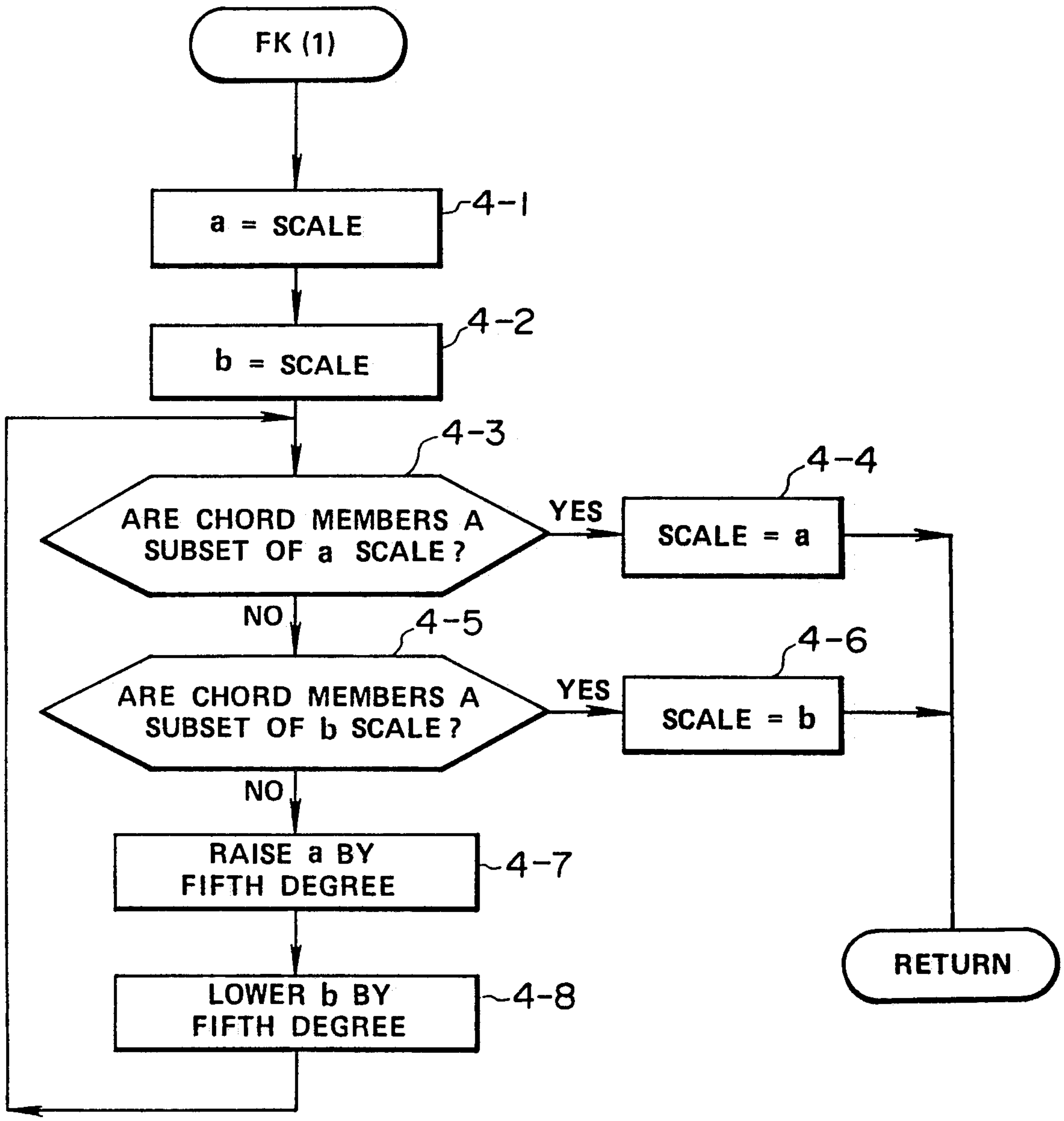
Figure 5:
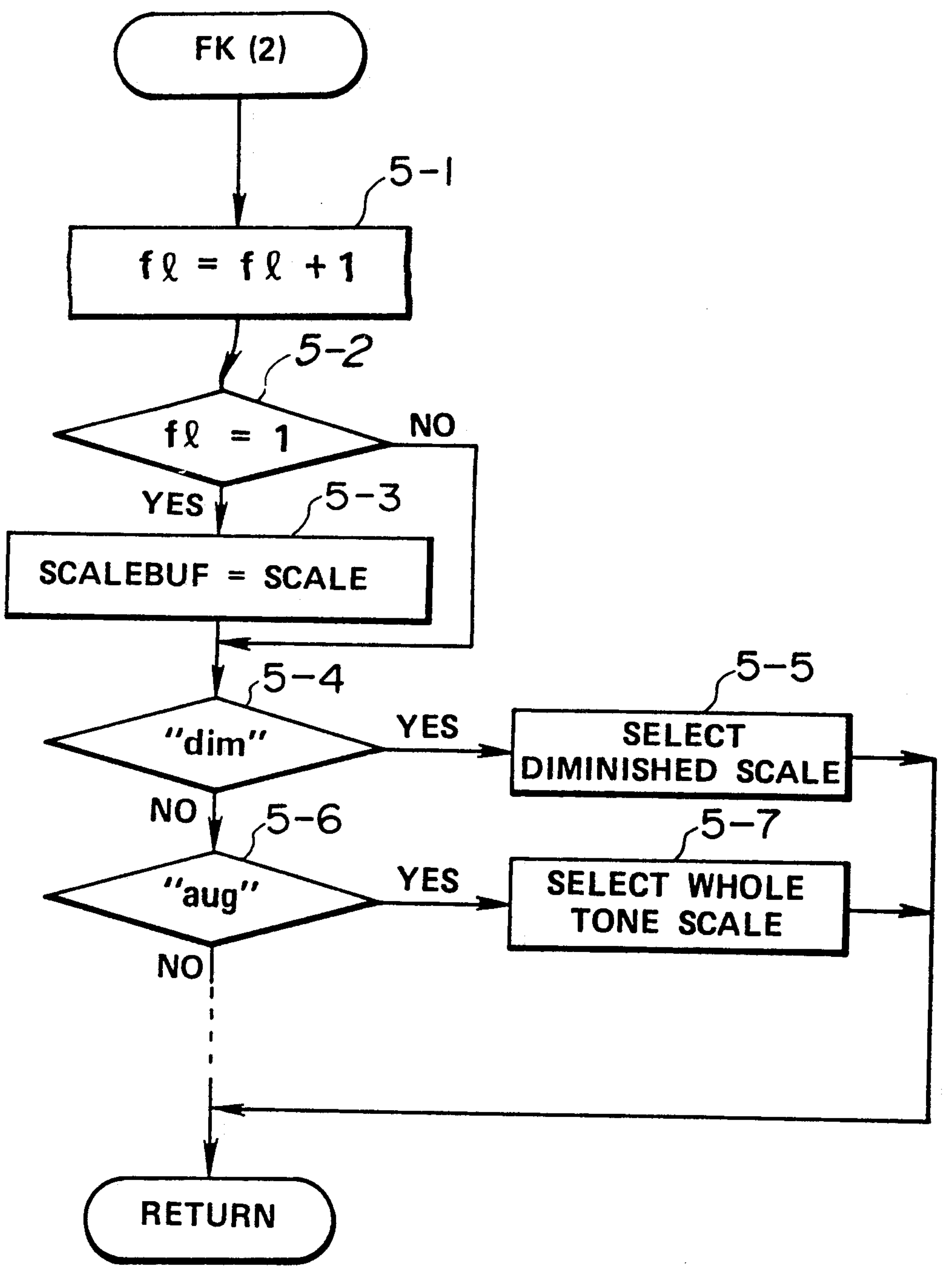
Figure 7:
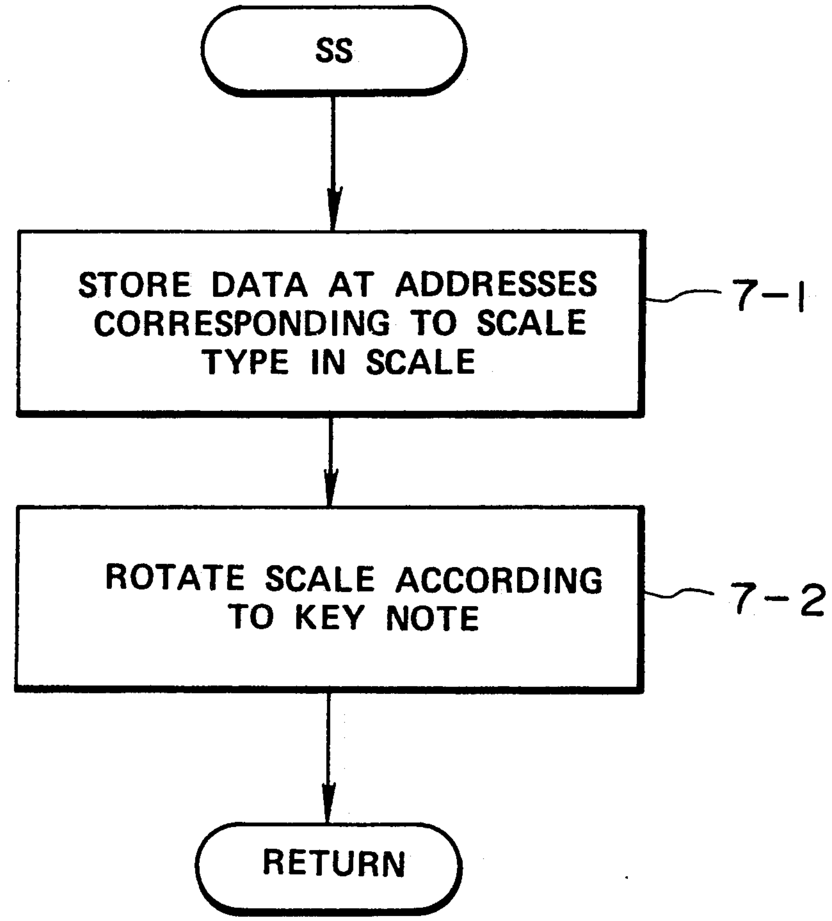
Figure 8:
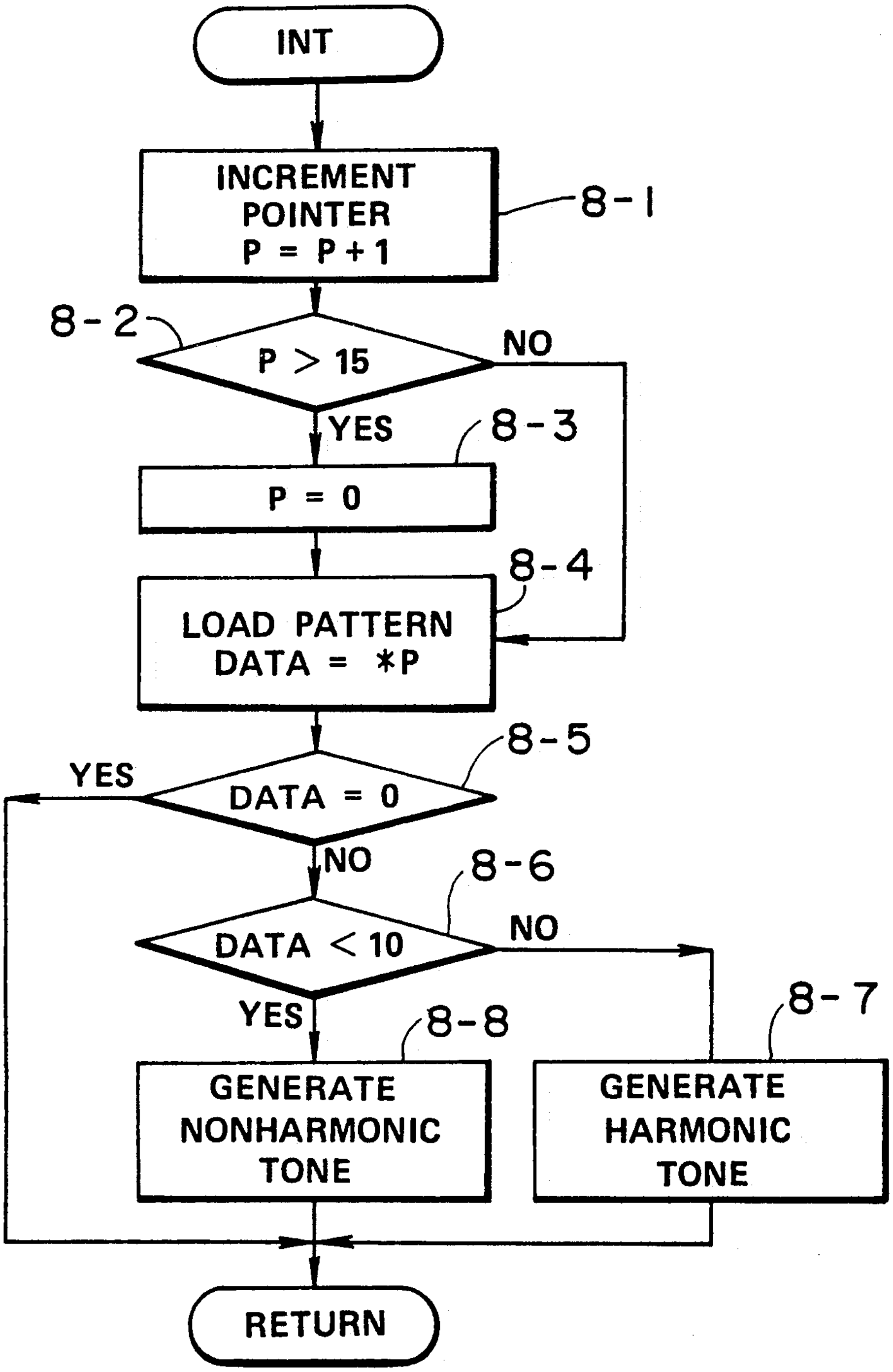
Figure 9:
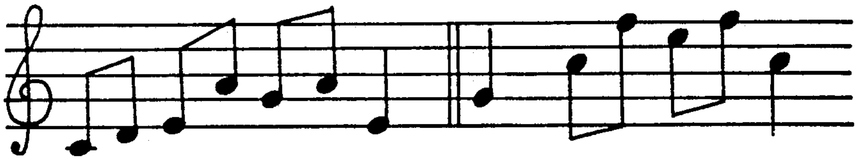
Figure 10:
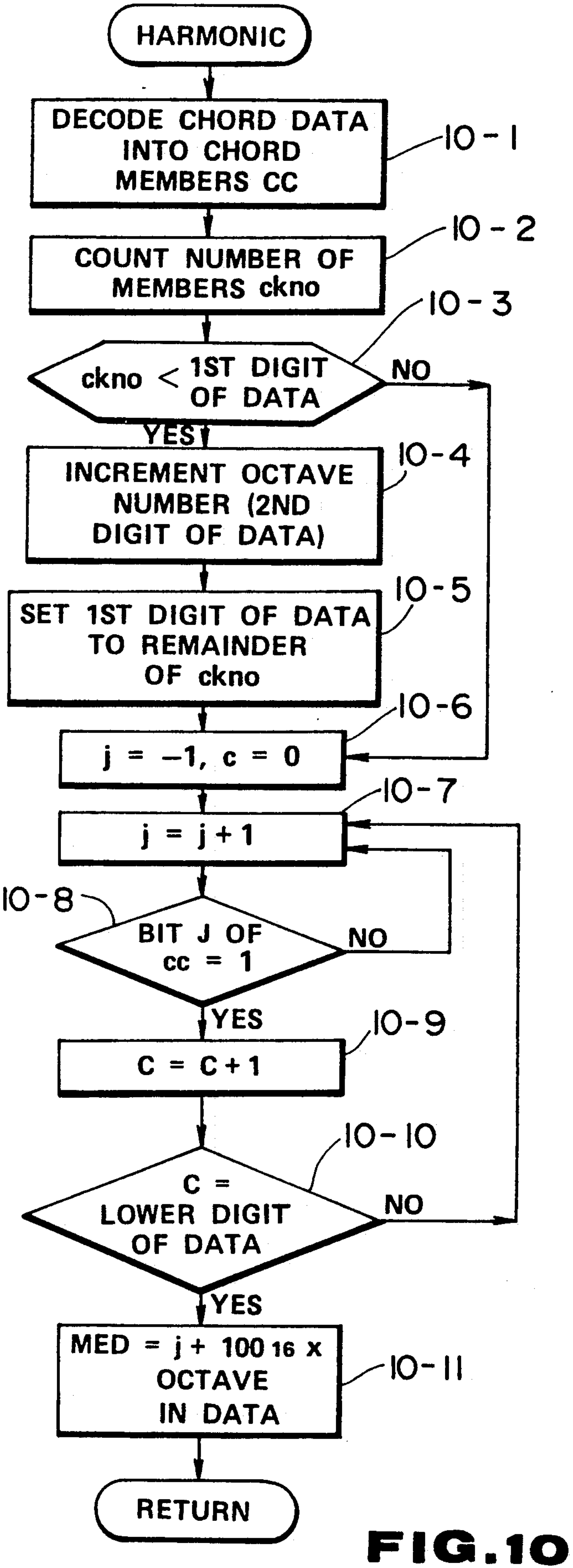
Figure 11:
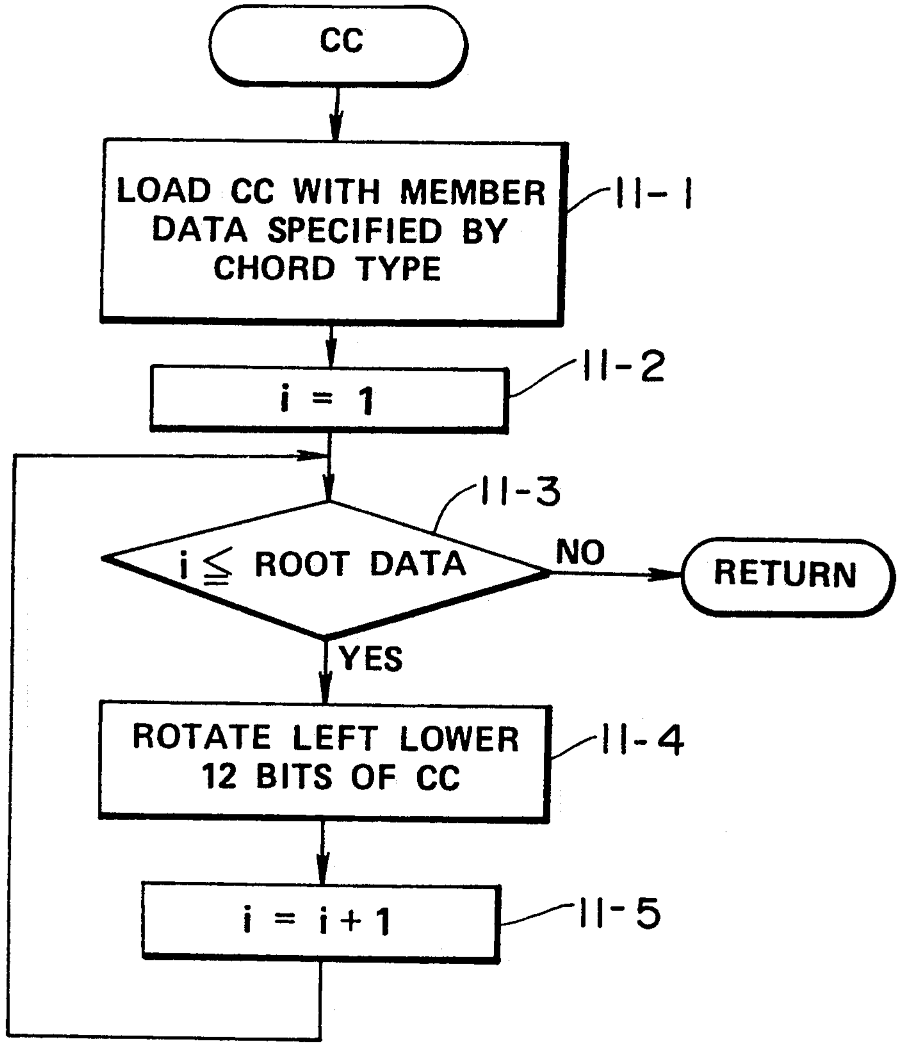
Figure 12:
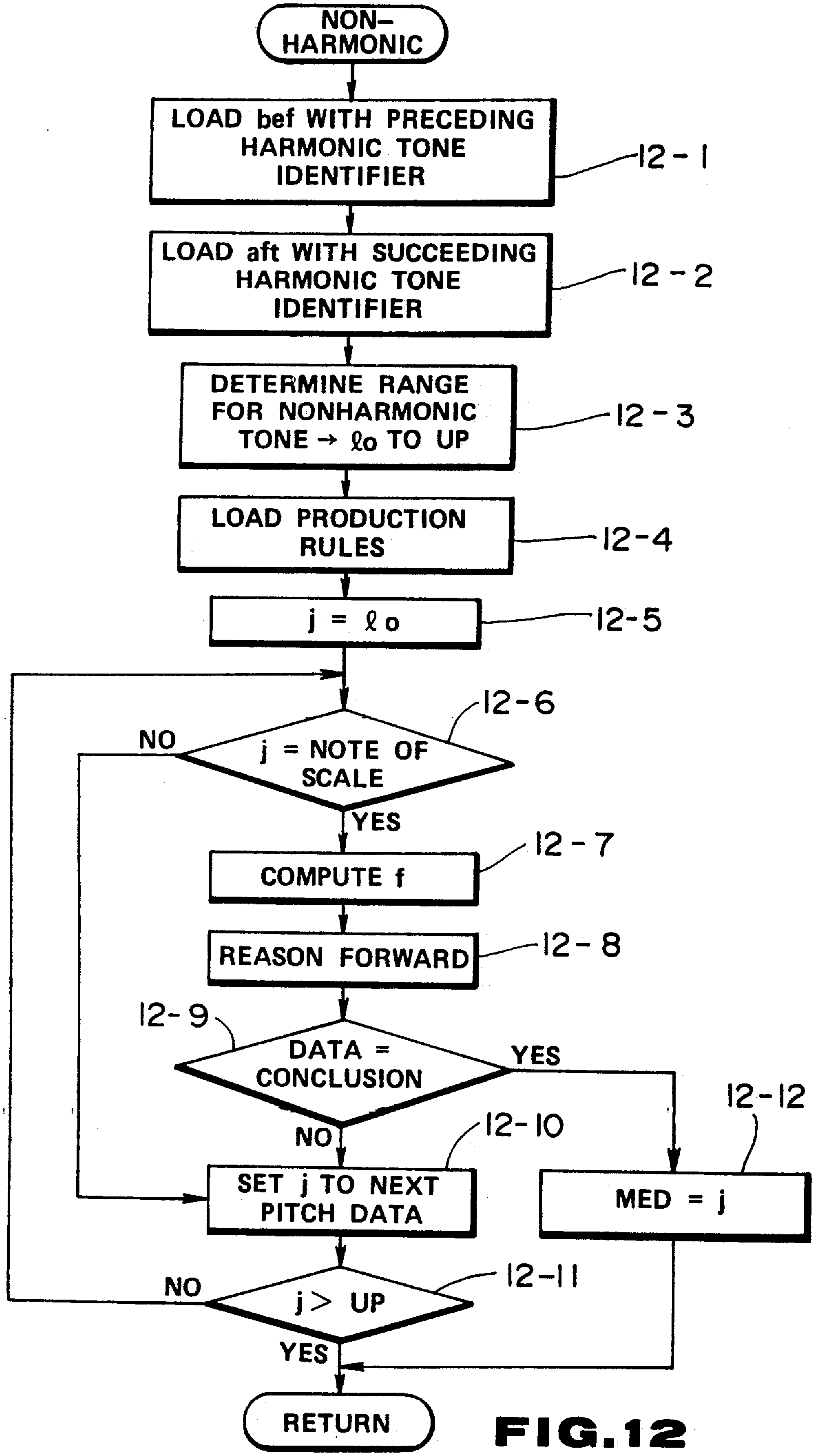
Figure 13:
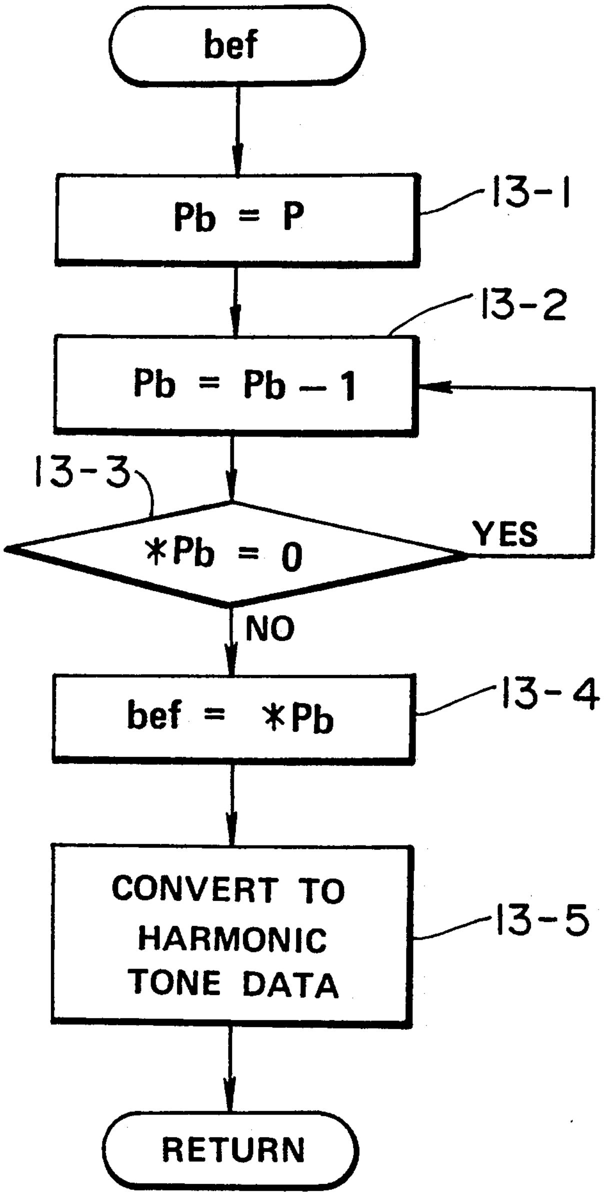
Figure 14:
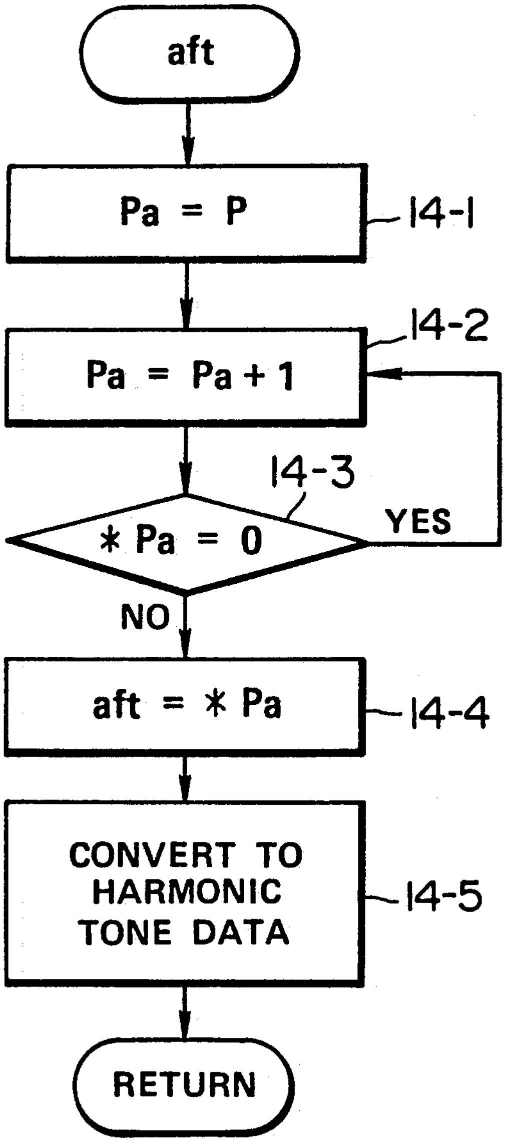
Figure 15:
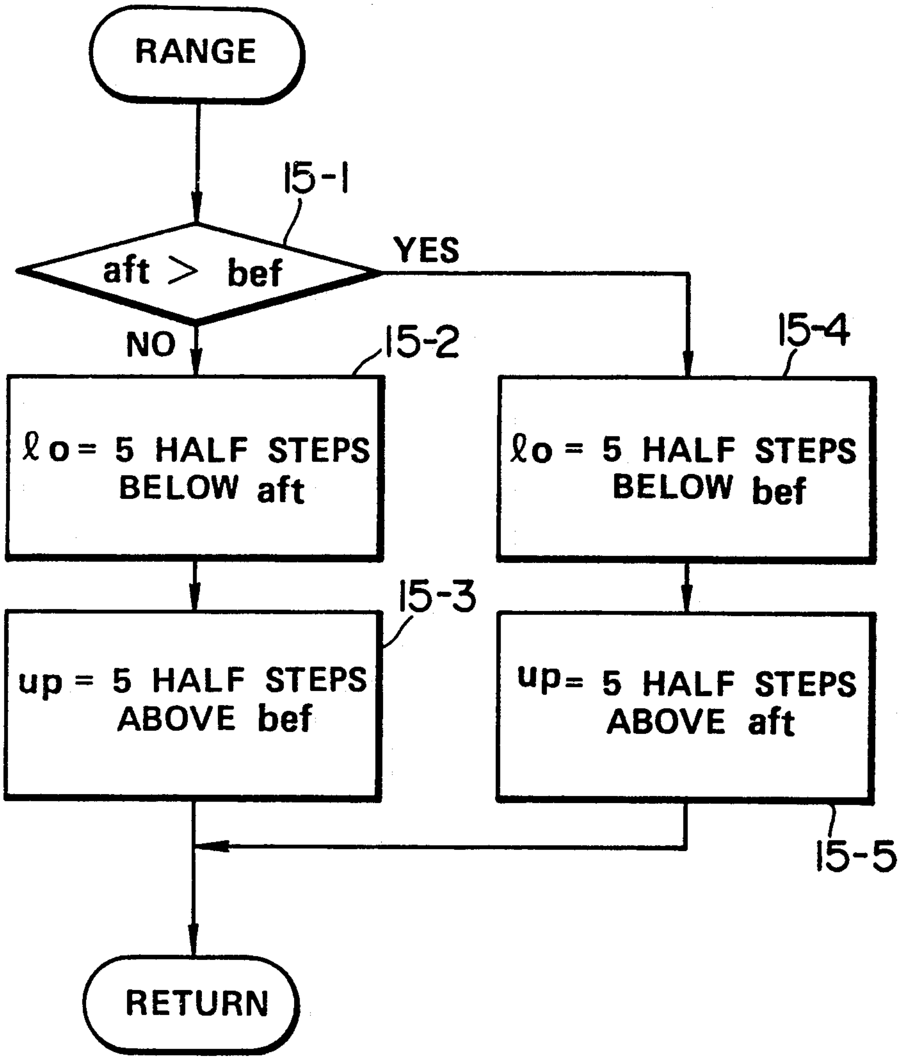
Figure 16:
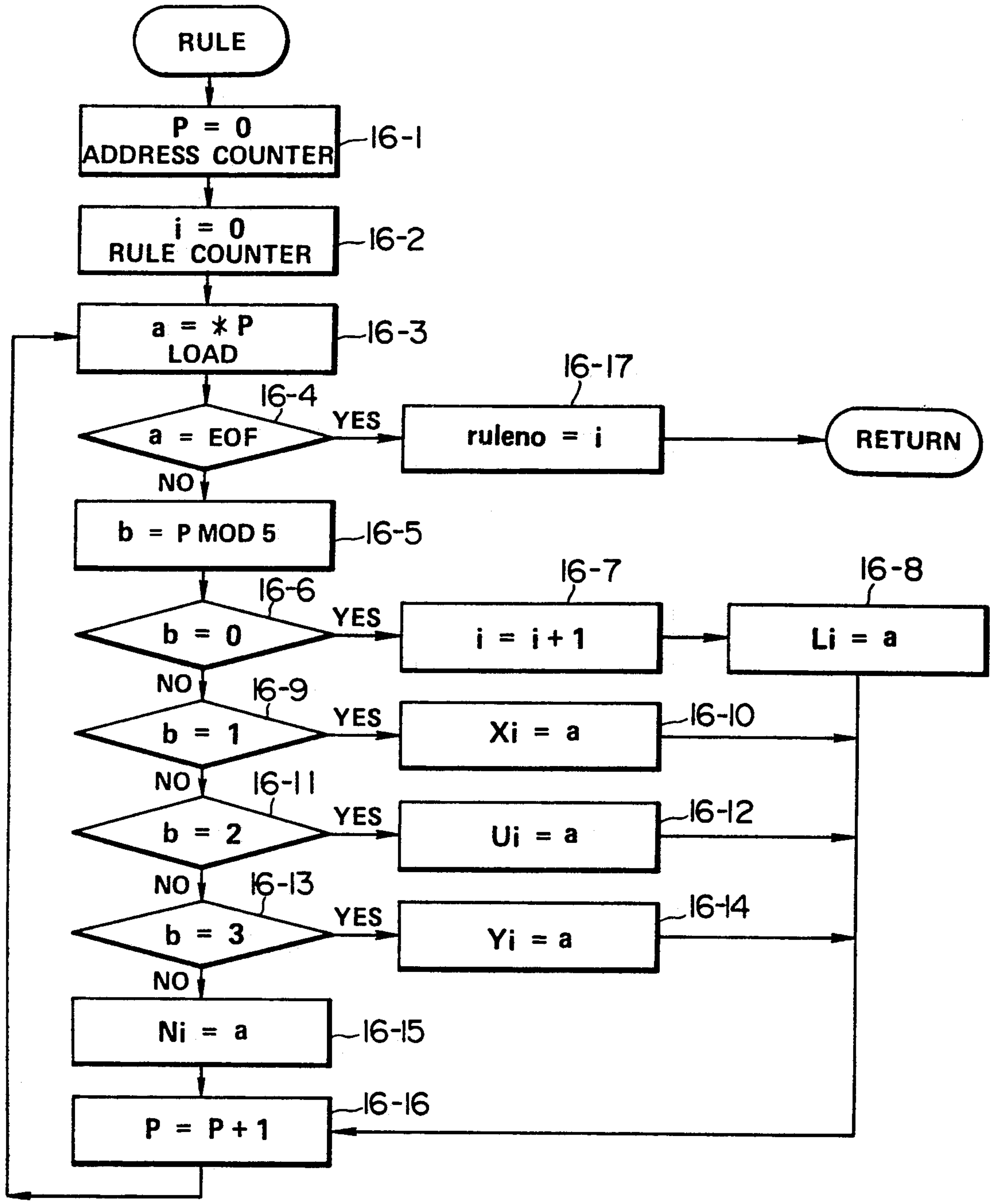
Figure 17:
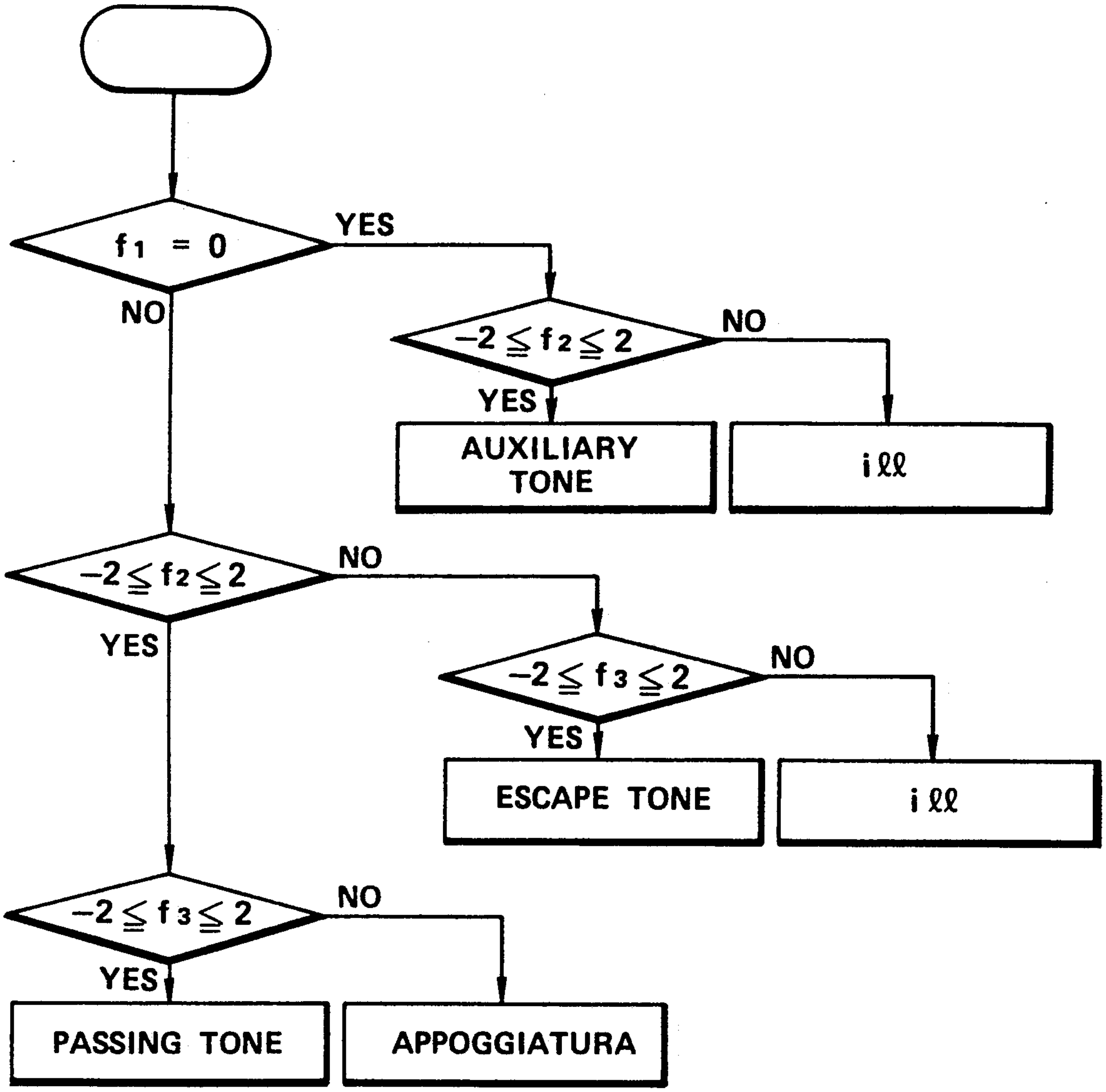
Figure 18:
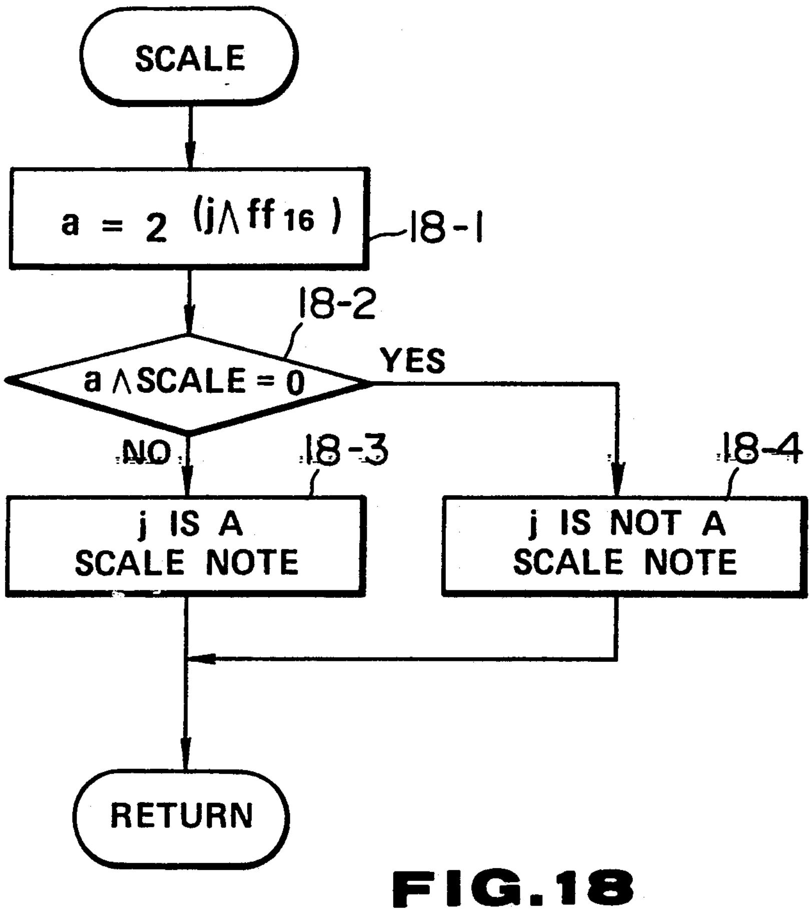
Figure 19:
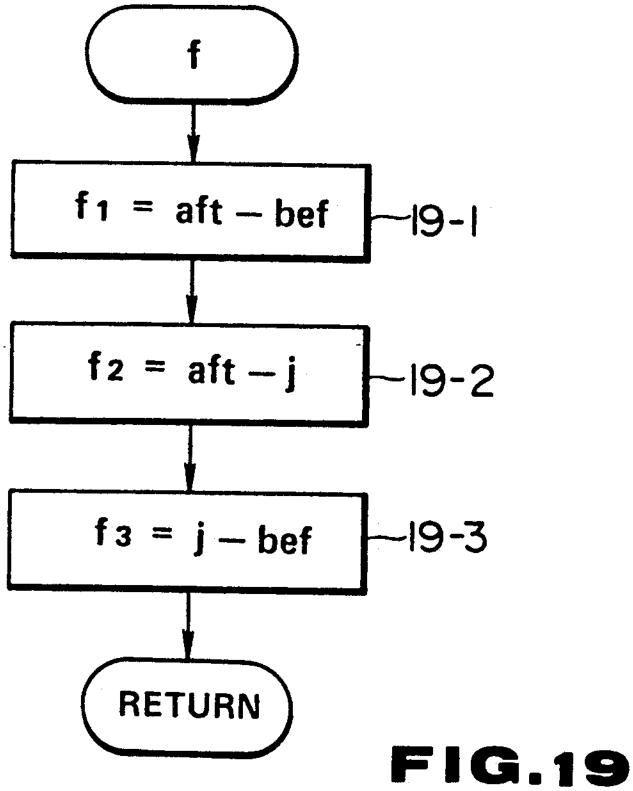

FIG. is a flowchart for producing scale data in consideration of a key;

FIG. 4 is a flowchart showing the details of "find key (1)" in FIG. 3;

FIG. 5 is a flowchart showing the details of "find key (2)" in FIG. 3;

FIG. 6 shows the correspondence between chord and scale;

FIG. 7 is a flowchart for generating a scale from scale type and key note;

FIG. 8 is a flowchart of an interrupt routine for producing accompaniment data;

FIG. 9 illustrates pattern data stored in a pattern memory together with an example of the resultant accompanimental line;

FIG. 10 is a flowchart for generating harmonic tone data of accompanimental line;

FIG. 11 is a flowchart for decoding chord data into member data, also showing an example of data stored in a chord member memory;

FIG. 12 is a flowchart for generating nonharmonic tone data of the accompanimental line;

Fig. 13 is a flowchart for finding a harmonic tone immediately before a nonharmonic tone candidate;

Fig. 14 is a flowchart for finding a harmonic tone immediately after the nonharmonic tone candidate;

FIG. 15 is a flowchart for setting upper and lower pitch limits of the nonharmonic candidate;

FIG. 16 is a flowchart for loading production rules, also exemplifying production rule data;

Fig. 17 is a net of knowledge of classifying nonharmonic tone, as represented by the production rule data;

FIG. 18 is a flowchart for matching the nonharmonic tone candidate against a key-determined scale;

FIG. 19 is a flowchart for computing functions; and

Figure 20:
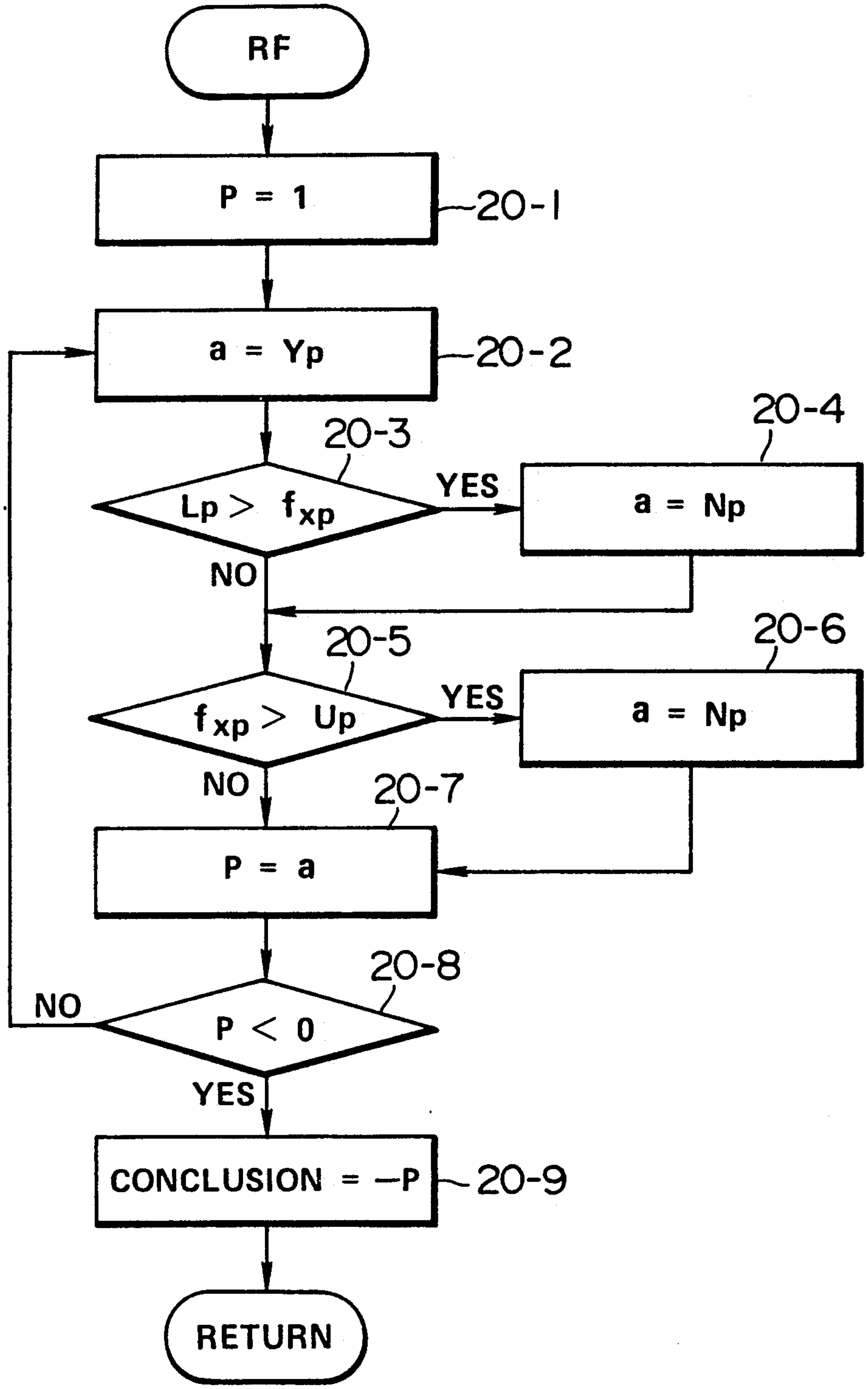

FIG. 20 is a flowchart for identifying the type of the tone candidate, using the production rule date.

DETAILED DESCRIPTION OF A PREFERRED EMBODIMENT

Overall Arrangement

Figure 1:
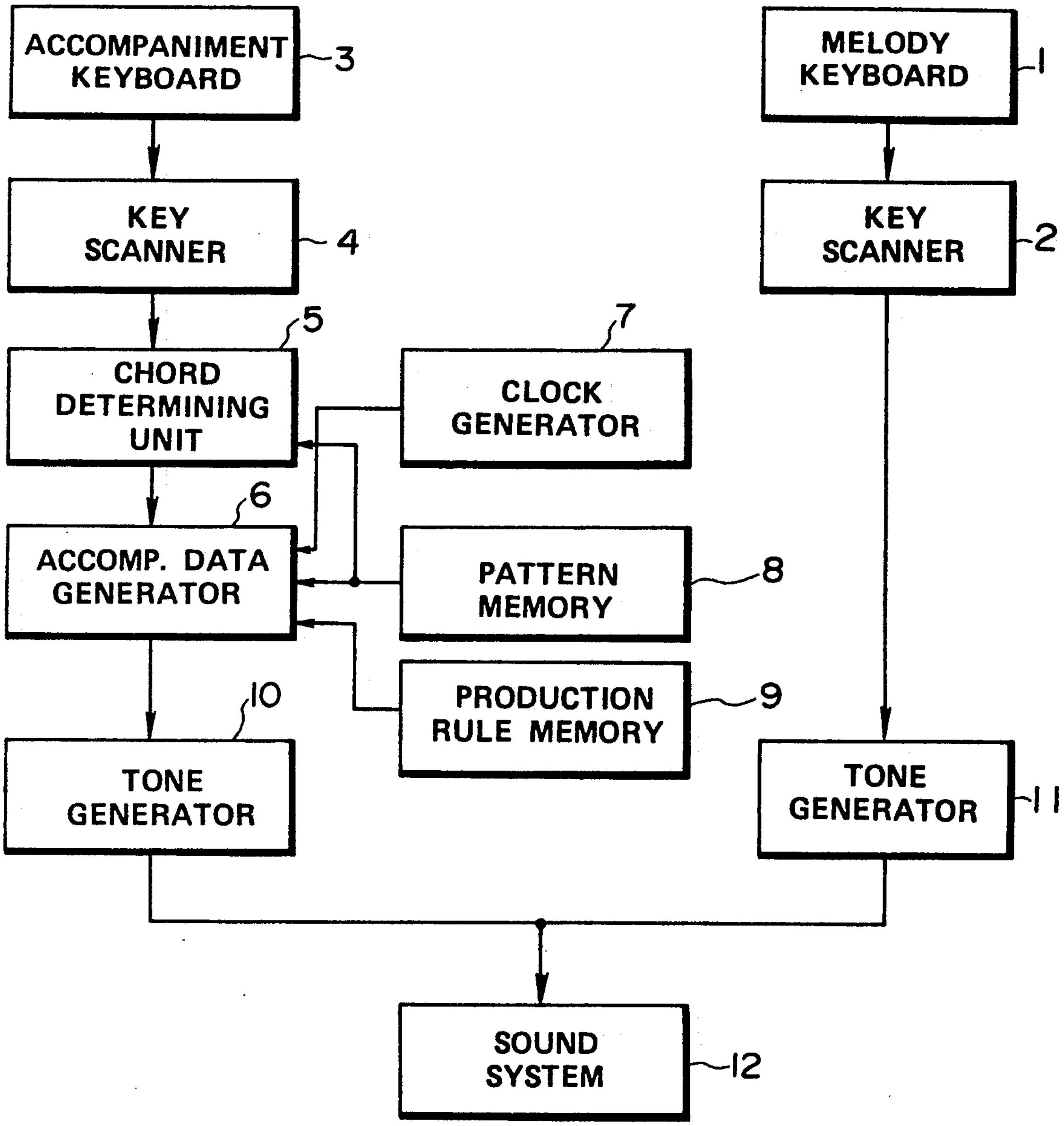
FIG. 1 shows an overall arrangement of an automatic arpeggio apparatus embodying the present invention.

Referring to FIG. 1, there is shown an overall arrangement of an automatic accompaniment apparatus incorporating the features of the invention. A certain (usually higher) range of a musical keyboard forms a melody keyboard 1. A key scanner 2 detects depressed keys in the range. An accompaniment keyboard 3 is assigned another (usually lower) range of the musical keyboard in which key depressings are monitored by a key scanner 4. The accompaniment key-depressing data sensed by the key scanner 4 are supplied to a chord determining unit 5 which then extracts information specifying a chord i.e., root and type of chord in a conventional manner.

An accompaniment data generator 6 is a featuring element of the embodiment. To develop accompaniment data, the generator 6 makes use of the chord determining unit 5, a clock generator 7 which generates a clock signal corresponding to the pattern resolution, a pattern memory 8 which stores accompaniment pattern data and a production rule memory 9 which stores musical knowledge of classifying nonharmonic tones. At each address in the pattern memory 8 that corresponds to each timing of sounding a tone, a harmonic tone identifier specifying the type of chord member (chord member number and octave code) or a nonharmonic tone identifier specifying the type of nonharmonic tone is stored (see FIG. 9). Such accompaniment pattern data elements are successively and cyclically accessed at the rate of the clock signal from the clock generator 7. Upon receipt a new chord (root and type) from the chord determining unit 5, the accompaniment data generator 6 determines a key in the current chord duration and produces scale data having the determined key in a manner to be described later. As will be seen, the scale data specify the tones that are available for the accompanimental line. When reading a harmonic tone identifier from the pattern memory 8, the accompaniment data generator 6 converts the harmonic tone identifier to a corresponding pitch by using the current root and type of chord. Repeating this, a row of harmonic tones in the accompanimental line is formed. When reading a nonharmonic tone identifier from the pattern memory 8, the accompaniment data generator 6 finds pitches of harmonic tones before and after the nonharmonic tone identifier by converting the two neighboring harmonic tone identifiers into pitches, using the current chord, and from the harmonic tone pitches, determines a range in which a nonharmonic tone is to be positioned. Then, the accompaniment data generator 6 selects a nonharmonic tone candidate from a position of the scale within the range, computes functions indicative of the situation of the accompanimental line from the pitch of the candidate and pitches of neighboring harmonic tones, and applies the computed situation to the production rules to deduce the type of nonharmonic tone for the candidate. The deduced type is then matched against the nonharmonic tone identifier in the accompaniment pattern. If match, the pitch of the candidate is added as a nonharmonic tone to the line of harmonic tones.

The accompaniment data produced by the accompaniment data generator 6 are supplied to a tone generator 10 which converts the data into musical tone signals. Melody data from the melody keyboard are passed through the key scanner 2 to a tone generator 11 which also converts the data into tone signals. The outputs from the tone generators 10 and 11 are sounded by a sound system 12 connected thereto.

Main Flow

FIG. 2 shows a main flow of the operation of the embodiment. The key scanner 4 detect depressed keys in the accompaniment keyboard 3 (step 2-1). The chord determining unit 5 identifies the root and type of chord from the depressed keys (step 2-2). According to the chord root and type, the accompaniment data generator 6 produces scale data to restrict notes available for the generation of accompaniment data in consideration of tonality (step 2-3).

Generate Scale

The details of "generate scale 2-3" will be described in conjunction with FIGS. 3 to 7. The illustrated example is based on the following principles.

A first principle (A) says that for each chord, there is one or more scales that are assignable to the chord. Following the principle and for the purpose of convenience, the embodiment assumes one-to-one correspondence between chord type and scale type, as exemplified in FIG. 6. A second principle (B) states that a natural scale such as a diatonic scale is closely related to tonality so that an effect of modulation is produced by changing the key note of the scale. A third principle (C) states that an artificial scale is remotely connected to tonality. According to these principles, the embodiment separately produce a key note of scale depending on whether the current chord from the chord determining unit 5 can correspond to a diatonic scale. In addition, when the current chord is correspondable to a diatonic scale, the embodiment produces the current key (tonic on the diatonic scale) based on the preceding scale obtained in the duration of the preceding chord that can correspond to a diatonic scale. In other words, if there are chords corresponding to artificial scales between diatonic scale corresponding chords, those scales obtained in such artificial scale corresponding chords will not exert any influence on determining the key of the scale at the next diatonic scale corresponding chord.

According to the flow of FIG. 3, a check is made in step 3-2 as to whether the chord in the current interval (last detected by the chord determining unit 5) can correspond to a diatonic scale. If this is the case, a flag fl indicating the number of non-diatonic scale corresponding chords (non-diatonic chords) between diatonic scale corresponding chords (diatonic chords) is checked in step 3-3. If fl≧1, fl is reset to "0" (step 3-4), the scale data stored in scale buffer SCALE BUF (step 3-5) are moved to register SCALE, and "find key (1)" is executed (step 3-6). What is stored in the scale buffer SCALE BUF is the scale obtained in the interval of the preceding diatonic chord. "Find key (1)" routine 3-6 references the preceding scale to produce the current scale data. On the other hand, if the newly detected chord does not correspond to a diatonic scale, "find key (2)" routine 3-7 is executed.

The details of "find key (1)" are shown in FIG. 4. This routine is based on the following principles: (a) it is better to maintain the key as far as possible, (b) but, key should be changed when there is a chord member outside the scale, (c) when changed, the key is likely to move to a related key. According to the principles, the routine of FIG. 4 loads registers "a" and "b" with the existing (preceding) scale data SCALE (obtained for the previous diatonic chord interval). Then, it is checked in steps 4-3, 4-5 as to whether the members of the current chord is a subset of scale "a" or "b". If this is affirmative, scale "a" or "b" is selected to be the current scale data SCALE (steps 4-4, 4-6). If the requirements in steps 4-3, 4-5 are not met, scale "a" is changed to a dominant scale that is five degrees higher (step 4-7) and scale "b" is changed to a subdominant scale, five degrees lower (step 4-8). Then, the checks in steps 4-3, 4-5 are repeated.

Assume, for example, that the existing scale (SCALE) is a diatonic scale having a key of C. Now, the chord determining unit 5 detects a minor chord with a root of E (E minor). Since the minor chord is a diatonic chord (with all members being contained in a diatonic scale having a key note that is higher than the chord root by minor third degrees), the routine of "find key (1)" is executed. At the first check in step 4-3 after passing 4-1 and 4-2 operations, members E, G, B of the chord E minor are found to be a subset of the existing scale consisting of C, D, E, F, G, A and B. Thus, the step 4-4 accepts the existing scale as the current scale.

FIG. 5 shows details of "find key (2)" routine that is activated when a chord newly detected by the chord determining unit 5 is a non-diatonic chord. The first step 5-1 increments fl. The next step 5-2 checks whether fl is equal to "1". If fl=1, this means that the chord immediately preceding the current non-diatonic chord was a diatonic chord. At this point, the register SCALE contains scale data obtained for the immediately preceding diatonic chord. This scale data must be kept to produce scale data for the subsequent diatonic chord. To this end, step 5-3 saves the scale data SCALE in scale buffer SCALE BUF. Then, if the current chord is a diminished chord (dim), a diminished scale is selected to be the current scale data (5-4, 5-5). If the current chord is an augmented chord (aug), the whole-tone scale is selected to be the current scale data (in steps 5-6, 5-7). FIG. 7 shows details of "generate scale" routine executed in the course of operations 5-5, 5-7. First step 7-1 calculates addresses in a scale memory (not shown) storing scale data corresponding to the chord and loads the scale data into register SCALE. Step 7-2 rotates SCALE as many times as the root number. Assume, for example, that a diminished scale having a key of C is stored in the scale memory. When a diminished chord with a root of D (D dim) is detected, the step 5-5 is executed: Load SCALE with the diminished scale of C. Then, using the root as a key note, convert SCALE to a scale having a key of D. Format of scale data in the scale memory may have a size of 12 bits with C-natural assigned to the lowest bit, C-sharp assigned to the second lowest bit and so on. Any bit having a value of "1"

indicates a scale note. The scale is raised by a semitone by rotating the scale data elements to the next higher bits with MSB going back to LSB. By repeating twice, scale data having a key of C will be converted to those having a key of D.

Produce Accompaniment Data

In the embodiment, accompaniment data are produced in an interrupt routine that are executed at time intervals corresponding to the pattern resolution (i.e., the frequency of the clock signal from the clock generator 7). For the purpose of convenience, it is assumed that the pattern resolution is 16 per measure.

The interrupt routine is shown in FIG. 8. When the clock generator 7 generates a clock pulse, this starts the routine so that step 8-1 increments a pointer P indicative of a position within a measure. If the pointer crosses a bar-line ($P>15$), P is reset to "0" indicative of the start of measure (steps 8-2, 8-3). Thereafter, step 8-4 reads a pattern data element at an address in the pattern data memory 8, as specified by pointer B (see the pattern data format in FIG. 9). If the read pattern data element indicates nil (data=0), do nothing and go back to the main routine (FIG. 2). For data element to be processed, check is made in step 8-6 as to whether the data element is a nonharmonic tone identifier ($data<10$), or a harmonic tone identified ($data \geqq 10$). A harmonic tone is formed in step 8-7 in case of harmonic tone identifier while a non-harmonic tone is produced in step 8-8 in case of nonharmonic tone identifier.

Details of "generate harmonic tone" routine 8-7 are shown in FIG. 10. At first, from the current chord root and type, chord member data CC are formed (step 10-1). The details are depicted in FIG. 11. The current type of chord is used to point to an address in a chord member memory (see the lower part of FIG. 11) and the member data stored at that address and having an effective size of 12 bits with a root of reference, here C, are moved to a register CC (step 11-1). Then, the member data of 12 bits are rotated left as many times as the current chord root number. Let, for example, the current chord type be major and the current chord root be G. Then, from the chord member memory, member data 091 (hexadecimal) for major chord of C are read out:

```
0 0 0 0 1 0 0 1 0 0 0 1 (binary)
        .     .       .
        G     E       C
```

If the member data are rotated to the left by 7, the value of root data indicative of G, we obtain the member data of chord G major:

```
1 0 0 0 1 0 0 0 0 1 0 0
.       .         .
B       G         D
```

After obtaining the chord member data, the number of the chord members is calculated by counting bits of "1" contained in the data and placed in a register CKn0 (step 10-2). Then, it is checked in step 10-3 as to whether the member specified in the lower digit of harmonic tone identifier (data) is greater than the number of chord members CKn0. If this is affirmative, the octave number indicated in the upper digit of data (see FIG. 9) is incremented (step 10-5) and the lower digit of data is set to the remainder of CKn0 (step 10-5). Let, for example, the pattern data element read from the pattern memory 8 be a harmonic tone identifier of 34 indicating a tone of the fourth chord member on third octave, and the current chord be a triad (e.g., major chord) having three members. The above operations change the identifier to 41 indicating a tone of the first chord member on fourth octave. In step 10-6, j for counting bit locations of chord member data CC (pitch name) is set to "−1" and C for counting 1's bits of data CC (members) is initialized to "0". Then, the pitch name counter j is incremented (step 10-7) and it is checked whether there is a chord member at the position of pitch name j (step 10-8). When a member is founded, member counter C is incremented (step 10-9). Then check is made as to whether the member count C has reached the chord member number specified in the pattern data element (step 10-10). By looping the steps 10-7 to 10-10, the pitch name j is found which corresponds to the chord member number in the pattern data element. Then, accompaniment data element MED is formed by pitch name j+100 (hexadecimal) x octave number in pattern element (step 10-11).

In this manner, "generate harmonic tone" routine converts a harmonic tone identifier contained in the pattern data to data MED in the form of pitch by using the current chord information.

FIG. 12 shows details of "generate nonharmonic tone" routine 8-8 which is activated when a nonharmonic tone identifier is read from the pattern memory 8. To provide a nonharmonic tone, this routine makes use of key-determined scale data SCALE and production rules representing knowledge of classifying nonharmonic tone. A nonharmonic tone to be added to the accompaniment must satisfy the following condition:

(a) The tone is within a predetermined range, (b) the tone is contained in the key-determined scale data, and (c) the type of the tone (deduced by using the production rule memory 9) matches the type specified by the nonharmonic tone identifier in the accompaniment pattern.

In order to apply the production rules, it is necessary to evaluate the situation of the portion of the accompanimental line already established because the character of a nonharmonic tone depends on the situation of the line. Such evaluation is done by step 12-1 of reading the immediately preceding harmonic tone data, step 12-2 of reading the immediately succeeding harmonic tone data and step 12-7 of computing functions. In step 12-3, the range in which a nonharmonic tone line is determined from the two neighboring harmonic tones. In step 12-4, the production rule data are loaded form the production rule memory 9.

Details of loading the immediately preceding harmonic tone data (step 12-1) are shown in FIG. 13. At first, a pointer P to the address of a nonharmonic tone identifier of interest is placed in a register Pb (step 13-1). Pb is successively decreased until the pattern element at the address Pb indicates a harmonic tone identifier. Then, that element is loaded into a register bef (steps 13-2 to 13-4). The reason for checking in step 13-3 whether * Pb=0 (now is not the time of sounding a tone) is based on the assumption made in the embodiment that the accompaniment pattern has at most one nonharmonic tone between two harmonic tones. Finally, the harmonic tone identifier bef is converted to harmonic tone data in the form of a pitch (step 13-5) in a manner similar to "generate harmonic tone" routine in FIG. 10.

Details of loading the immediately succeeding harmonic tone data are shown in FIG. 14. The process is identical to that shown in FIG. 13 except that pointer Pa is incremented from the current position P.

Details of setting lower and upper limits lo, up of the range in which a nonharmonic tone must be positioned (step 12-3) are shown in FIG. 15. In the present example, the upper limit "up" is given by a pitch higher than the higher one of the two neighboring harmonic tones bef and aft by five semitones while the lower limit "lo" is given by a pitch lower than the lower one of bef and aft by five semitones (steps 15-1 to 15-5).

FIG. 16 shows details of loading production rules (step 12-4). As illustrated in the lower part of FIG. 16, the production rule memory 9 has five data elements of L, X, U, Y and N per rule. L, X and U make a condition part of rule: $L \leqq Fx \leqq U$ indicating that function Fx of the type X is between lower limit L and upper limit U. Y contains a pointer to the rule to be referenced next when the condition part is satisfied, or a conclusion if there is no more rule to be referenced. N contains a pointer to the rule to be referenced next when the condition part is not met, or a result of reasoning if there is no more rule to be applied. The production rule data in FIG. 16 may be presented in a net of knowledge as shown in FIG. 17.

The routine of FIG. 16 initializes address counter P for the production rule memory 9 to "0" (step 16-1), initializes rule counter i to "0" (step 16-2), loads the rule data at P to a register "a" (step 16-3), and calculates the remainder from dividing P by 5 (step 16-5). If the remainder is "0", P points to lower limit data L placed at the front of a new rule so that rule counter i is incremented and the rule data "a" is loaded into register Li (step 16-6 to 16-8). Similarly, for the remainder of "1", rule data "a" is loaded into a register Xi as the type of function for the i-th rule (steps 16-9, 16-10), for the remainder of "2", rule data "a" is loaded into a register Ui as the upper limit data for the i-th rule (steps 16-11, 16-12), for the remainder of "3", rule data "a" is loaded into a register Yi as the affirmative answer data Y of the i-th rule (steps 16-3, 16-4) and for the remainder of "4", rule data "a" is loaded into a register Ni as the negative answer data N of the i-th rule (step 16-15). Address counter P is incremented (step 16-16), and the operations are repeated from step 16-3. When the read rule data indicates end of file EOF (step 16-4), the number of rules stored in i is placed into a resister ruleno (step 16-17), completing the process of loading production rules.

Then, turning back to the routine of FIG. 12, check is made as to whether a nonharmonic tone candidate j ranging from the lower pitch limit "lo" to the higher pitch limit "up" is a scale note (step 12-6). If the check is satisfied, functions f are computed from the nonharmonic tone candidate and the neighboring harmonic tones (step 12-7). Forward reasoning is carried out by applying the production rules to the computed functions (step 12-8), and check is made as to whether the result of reasoning matches the type of nonharmonic tone specified by the nonharmonic identifier in the accompaniment pattern (step 12-9). When the match is found here, pitch j does satisfy all the conditions of nonharmonic tone as mentioned above. Thus, the pitch j is used as accompaniment data MED (step 12-12). If candidate j is outside the scale or the result of reasoning (type of candidate) mismatches the type of nonharmonic tone indicated in the accompaniment pattern, j is incremented (step 12-10) and the test of nonharmonic tone is repeated with respect to the next pitch j. When $j > up$ is satisfied in step 12-11, this means failure of finding a nonharmonic tone having the character designated by the accompaniment pattern because of the situation of the neighboring harmonic tones. In this case, the system return to the main flow without producing any accompaniment data MED.

FIG. 18 shows details of scale check made in step 12-6 in FIG. 12. In step 18-1, pitch name of the nonharmonic tone candidate j is obtained from $2^{j \wedge ff}$ and stored in resister "a". Pitch name of C is indicated by LSB of "a" having a value of "1", pitch name of D is indicated by bit 2 of "1" and so on and finally pitch name of B is expressed by bit 12 of "1". This pitch name data "a" is compared with the scale data SCALE having a key determined in the main flow to see whether the pitch name data "a" is a subset of scale data SCALE (step 18-2). As stated, the scale data has a format in which pitch names are assigned to the respective bit positions and bits having "1" in the scale data represent notes of the scale. If logical AND of pitch name data "a" for candidate and scale data SCALE results in "0", this means that the candidate is outside the scale. For example, diatonic scale data with a key of G is given by:

1 0 1 0 1 1 0 1 0 1 0 1 (binary)
.
.
.
G

Pitch name data of Bb is given by:

0 1 0 0 0 0 0 0 0 0 0 0

Logical AND results in:

0 0 0 0 0 0 0 0 0 0 0 0

Thus, it is found that B flat is outside the diatonic scale of G. Accordingly, if a Λ SCALE=0, step 18-4 concludes that the candidate's pitch j is not a scale note. If a Λ SCALE=0, step 18-5 concludes that the candidate's pitch is a scale note.

FIG. 19 shows the details of step 12-7 (FIG. 12) for computing functions. First function f1 is given by the difference between the immediately following harmonic tone aft and the immediately preceding harmonic tone bef (step 19-1). Second function f2 is computed by the difference between the immediately following harmonic tone aft and the candidate's pitch j (step 19-2). Third function f3 is given by the difference between the candidate's pitch j and the immediately preceding harmonic tone bef (step 19-3).

FIG. 20 shows the details of forward reasoning operation 12-8 in FIG. 12. First, rule pointer P is set to "1" pointing to a root rule (step 20-1). Register "a" is then loaded with affirmative answer part Yp of the rule specified by pointer P (step 20-2). If $Lp > fxp$ or $fxp > Up$ is satisfied (steps 20-3, 20-5), i.e., the condition part of the rule $Lp \leqq fxp \leqq Up$ is false, the content of register "a" is changed to the negative answer part Np of the rule (step 20-6). The data in "a" is moved to P (step 20-7). Then, check is made as to whether $P<0$, that is, P is the conclusion of reasoning or points to a rule to be applied next (step 20-8). If $P>0$, reasoning operations from step 20-2 continues. If $P<0$, the absolute value of P is placed into a conclusion register, completing the forward reasoning (step 20-9).

Let the production rules shown in FIG. 17 be applied, the immediately preceding harmonic tone be "do", the immediately following harmonic tone be "mi", and the nonharmonic tone candidate be "re". In this case, the difference f1 between the neighboring harmonic tones is given by "4" indicative of major third degree. The difference f2 between the candidate and the immediately following harmonic tone is "2" indicative of major second. The difference f3 between the candidate and the immediately preceding tone is "2" also indicative of major second. Forward reasoning is performed as follows.

When $P=1$, the condition part $0<f1<0$ of rule 1 is not met because $f1=4$. Thus, the negative answer part N1 having "3" points to the rule to be applied next ($P\leftarrow3$).

When $P=3$, the condition part $-2\leqq f2\leqq 2$ of rule 3 is satisfied because $f2=2$. The affirmative part Y3 of rule 3 is negative of "$-1$", the absolute value of which indicates a nonharmonic identifier of passing tone. It is now concluded that "re" in the succession of "do", "re", "mi" is a passing tone.

In this manner, "generate nonharmonic tone" routine selectively produces a nonharmonic tone and combines it with the accompanimental line of harmonic tones on the conditions that the nonharmonic tone is positioned in a pitch range restricted by the neighboring harmonic tones, that the nonharmonic tone is a note of the key-determined scale and that the type of the nonharmonic tone concluded by the production rules matches that specified in the accompaniment pattern. Therefore, the nonharmonic tone that is added to the accompaniment is proper in terms of tonality. Further, it is supported by musical knowledge of classifying nonharmonic tones.

Initialization of scale data may be implemented in several ways:

(a) set a diatonic scale of C at the time of power on, (b) detect the first chord in the course of playing and select a diatonic scale having a key note equal to the chord root if the first chord is a major class or selects a diatonic scale having a key note higher than the chord root by minor third degree if the first chord is a minor class, or (c) input and initial scale from the player.

This concludes the description of the embodiment. However, various modifications, alternations and improvements are obvious to a person of ordinary skill in the art without departing from the scope of the invention. One improvement may comprise inversion means for inverting (pitch-shifting) harmonic tone identifiers of the accompaniment pattern as many times as designated number of inversions. For example, if the number of inversions is "2", a harmonic tone identifier of, say, "31" indicating first chord member on third octave is changed to "33" indicating third chord member on third octave. The lower part of FIG. 9 shows a staff of an accompanimental line in root position (number of inversions ="0") together with corresponding accompaniment line in the second inversion (number of inversions ="2"). A device for designating the number of inversions may be implemented by the technique of automatically deducing the number of inversions from chord progression data, as disclosed in U.S. patent application Ser. No. 224,120 filed on July 25, 1987, assigned to the same assignee as the present application. Therefore, the scope of the invention should be limited solely by the appended claims.

What is claimed is:

1. An apparatus for automatically providing an accompanimental line formed by a succession of harmonic and nonharmonic tones in response to chords supplied from a musical performance input means, comprising:

key determining means for automatically and variably determining a key in a current chord interval as a function of a series of supplied chords from said musical performance input means;

arpeggio line forming means for producing a line of harmonic tones in a current chord interval using members of a current chord supplied from said musical performance input means; and nonharmonic tone adding means for selecting nonharmonic tones from a scale of the determined key from said key determining means and for adding the selected nonharmonic tones to said line of harmonic tones.

2. The apparatus of claim 1, wherein said key determining means comprises:

key preserving means for maintaining the key in the current chord interval unchanged from the preceding key whenever all the members of a chord in the current chord interval are included in the scale of the preceding key; and modulation means for changing the key in the current interval from the preceding key when the chord in the current chord interval contains a member outside the scale of the preceding key.

3. The apparatus of claim 2, wherein:

said key determining means further comprises means for selecting the root of a chord in the current chord interval to be the key in the current chord interval when the chord in the current chord interval is a non-diatonic chord;

said key preserving means and said modulation means are operable only when the chord in the current chord interval is a diatonic chord; and the preceding key referenced by said key preserving means and said modulation means is a key determined in the preceding interval with a chord that is a diatonic chord.

4. An apparatus for automatically providing an accompanimental line formed by a succession of harmonic and nonharmonic tones in response to successively supplied chords, comprising:

accompanimental pattern generator means for generating accompanimental pattern data forming a basis of the accompanimental line, said generated accompanimental pattern data including harmonic tone identifiers specifying types of chord members, timing data indicating when harmonic tones corresponding to the respective harmonic tone identifiers are to be sounded, nonharmonic tone identifiers specifying types of tones which are nonharmonic with respect to the specified types of chord members, and timing data indicating when nonharmonic tones corresponding to the respective nonharmonic tone identifiers are to be sounded;

arpeggio line forming means for decoding the respective harmonic tone identifiers in said accompanimental pattern data based on a current chord from the supplied chords to produce a line of harmonic tones in a current interval;

key determining means for determining a key in said current interval from a series of said successively supplied chords;

storage means for storing knowledge adapted to classify types of nonharmonic tones;

inference means for deducing nonharmonic tones by using said knowledge stored in said storage means, said nonharmonic tones being selected from a scale of the determined key from the key determining means and having the same types as those specified by said nonharmonic tone identifiers; and nonharmonic tone adding means for adding the deduced nonharmonic tones from said inference means to said line of harmonic tones.

5. The apparatus of claim 4 wherein said key determining means comprises:

key preserving means for maintaining the key in a current interval unchanged from the preceding key whenever all the members of a chord in the current interval are included in the scale of the preceding key; and modulation means for changing the key in the current interval from the preceding key when the chord in the current interval contains a member outside the scale of the preceding key.

6. The apparatus of claim 5 wherein:

said key determining means further comprises means for selecting the root of a chord in the current interval to be the key in the current interval when the chord in the current interval is a non-diatonic chord;

said key preserving means and said modulation means are operable only when the chord in the current interval is a diatonic chord; and the preceding key referenced by said key preserving means and said modulation means is a key determined in the preceding interval with a chord that is a diatonic chord.

7. The apparatus of claim 4 wherein said inference means comprises:

means for selecting a nonharmonic tone candidate from the scale of the determined key, exclusive of the members of the chord in the current interval;

means for computing a situation of an accompanimental line that will be formed when combining said nonharmonic tone candidate with said line of harmonic tones;

means for applying said knowledge stored in said storage means to said situation computing means for identifying a type of nonharmonic tone candidate; and means for comparing said identified type of nonharmonic tone candidate with that specified by a nonharmonic tone identifier.

8. The apparatus of claim 4, wherein said accompanimental pattern generator means includes means for automatically providing an accompanimental line formed by a succession of said harmonic tones and said nonharmonic tones.

9. An electronic musical instrument comprising:

musical performance input means including first means for successively designating tones forming a melodic line and second means for successively designating chords forming a chord progression;

first output means responsive to said first means for outputting said melodic line by sounding said designated tones;

accompaniment means responsive to said second means for automatically producing an accompanimental line subordinated to said melodic line, said accompanimental line being formed by a succession of harmonic and nonharmonic tones thereof;

second output means responsive to said accompaniment means for outputting said automatically produced accompanimental line by sounding said harmonic and nonharmonic tones; and said accompaniment means comprising:

key determining means for automatically and variably determining a key in a current chord interval as a function of a series of the supplied chords from said second means;

arpeggio line forming means for producing a line of harmonic tones in the current chord interval using members of a current chord from said second means; and nonharmonic tone adding means for selecting nonharmonic tones from a scale of the determined key from said key determining means and for adding the selected nonharmonic tones to said line of harmonic tones.

10. The instrument of claim 9 wherein said musical performance input means comprises a keyboard.

11. An electronic musical instrument comprising:

musical performance input means including first means for successively designating tones forming a melodic line and second means for successively designating chords forming a chord progression;

first output means responsive to said first means for outputting said melodic line by sounding said designated tones;

accompaniment means responsive to said second means for producing an accompanimental line subordinated to said melodic line, said accompanimental line being formed by a succession of harmonic and nonharmonic tones;

second output means responsive to said accompaniment means for outputting said produced accompanimental line by sounding said harmonic and nonharmonic tones thereof; and said accompaniment means comprising:

accompanimental pattern generator means for generating accompanimental pattern data forming a basis of the accompanimental line, said generated accompanimental pattern data including harmonic tone identifiers specifying types of chord members, timing data indicating when harmonic tones corresponding to the respective harmonic tone identifiers are to be sounded, nonharmonic tones identifiers specifying types of tones which are nonharmonic with respect to the specified types of chord members, and timing data indicating when nonharmonic tones corresponding to the respective nonharmonic tone identifiers are to be sounded;

arpeggio line forming means for decoding the respective harmonic tone identifiers in said accompanimental pattern data based on a current chord from said second means to produce a line of harmonic tones in a current interval;

key determining means for determining a key in the current interval from a series of the supplied chords from said second means;

storage means for storing knowledge adapted to classify types of nonharmonic tones;

inference means for deducing nonharmonic tones by using said knowledge stored in said storage means, said nonharmonic tones being selected from a scale of the determined key from the key determining means and having the same types as those specified by the nonharmonic tone identifiers; and nonharmonic tone adding means for adding the deduced nonharmonic tones from said inference means to said line of harmonic tones.

12. An apparatus for automatically providing an accompaniment line formed by a succession of harmonic and nonharmonic tones in response to successively supplied chords, comprising:

chord class checking means for checking a current chord from the supplied chords and for determining whether the current chord belongs to a predetermined class of chords;

first key determining means operable when the current chord is found by said chord class checking means to belong to said predetermined chord class for determining a key in a current interval of the current chord based on the current chord only;

second key determining means operable when the current chord is found by said chord class checking means not to belong to said predetermined chord class for determining key in the current interval based on both the current chord and at least one chord supplied before the current chord;

arpeggio line forming means for producing a line of harmonic tones in the current interval using members of the current chord; and nonharmonic tone adding means for selecting nonharmonic tones from a scale of the key in the current interval determined by one of said first and second key determining means and for adding the selected nonharmonic tones to said line of harmonic tones in the current interval, whereby an accompanimental line formed by a succession of said harmonic tones and said nonharmonic tones is automatically provided.

13. An apparatus for automatically providing an accompanimental line formed by a succession of harmonic and nonharmonic tones in response to successively supplied chords, comprising:

accompanimental pattern generator means for generating accompanimental pattern data forming a basis of the accompanimental line, said generated accompanimental pattern data including harmonic tone identifiers specifying types of chord members, timing data indicating when harmonic tones corresponding to the respective harmonic tone identifiers are to be sounded, nonharmonic tone identifiers specifying types of tones which are nonharmonic with respect to said specified types of chord members, and timing data indicating when nonharmonic tones corresponding to the respective nonharmonic tone identifiers are to be sounded;

arpeggio line forming means for decoding the respective harmonic tone identifiers in said accompanimental pattern data based on a current chord from the supplied chords to produce a line of harmonic tones in a current interval of the current chord;

key determining means for determining a key in the current interval;

storage means for storing knowledge adapted to classify types of nonharmonic tones;

inference means for deducing nonharmonic tones in the current interval based on said knowledge stored in said storage means, said key determined by said key determining means, and said nonharmonic tone identifiers in said accompanimental pattern data; and nonharmonic tone adding means for adding the deduced nonharmonic tones from said inference means to said line of harmonic tones.

14. The apparatus of claim 13, wherein said accompanimental pattern generator means includes means for automatically providing an accompanimental line formed by a succession of said harmonic tones and said nonharmonic tones.

* * * * *